(12) United States Patent
Nichols et al.

(10) Patent No.: US 8,818,699 B2
(45) Date of Patent: Aug. 26, 2014

(54) WEIGHT-BASED STABILITY DETECTION SYSTEM

(75) Inventors: Boyd M. Nichols, Dubuque, IA (US);
Carl R. Starkey, Dubuque, IA (US)

(73) Assignee: Deere & Company, Moline, IL (US)

(*) Notice: Subject to any disclaimer, the term of this patent is extended or adjusted under 35 U.S.C. 154(b) by 178 days.

(21) Appl. No.: 13/027,969

(22) Filed: Feb. 15, 2011

(65) Prior Publication Data
US 2012/0209502 A1  Aug. 16, 2012

(51) Int. Cl.
*G06F 17/10* (2006.01)
*G06G 7/48* (2006.01)

(52) U.S. Cl.
USPC ......... 701/124; 298/17 R; 298/17 S; 280/400

(58) Field of Classification Search
USPC ......... 701/42, 48, 50, 70, 82, 124, 37, 41, 38, 701/71, 78; 702/173, 175; 414/408, 482, 414/117; 340/429, 431, 440, 507; 298/12, 298/17 R, 17 S, 22 AE, 22 C, 19 R, 22 R; 280/124.13, 432, 681, 11.212, 124.1, 280/124.11, 124.15, 166, 33.991, 400, 402, 280/438.1, 788, 5.5, 781; 180/24.02; 177/1, 177/145, 209; 440/12.6, 37; 239/1, 11, 146, 239/167, 168, 172, 726
See application file for complete search history.

(56) References Cited

U.S. PATENT DOCUMENTS

| | | | | |
|---|---|---|---|---|
| 6,363,331 | B1* | 3/2002 | Kyrtsos | 702/175 |
| 6,452,487 | B1* | 9/2002 | Krupinski | 340/440 |
| 6,832,512 | B2* | 12/2004 | Miyazaki | 73/146 |
| 7,810,887 | B2* | 10/2010 | Hjerth et al. | 298/17 S |
| 2007/0027596 | A1* | 2/2007 | Stavroff et al. | 701/38 |
| 2008/0208416 | A1* | 8/2008 | Yuet et al. | 701/50 |
| 2009/0105908 | A1* | 4/2009 | Casey et al. | 701/41 |
| 2009/0196722 | A1* | 8/2009 | Anderson | 414/482 |
| 2010/0045092 | A1 | 2/2010 | Hjerth et al. | |
| 2010/0084908 | A1* | 4/2010 | Montocchio | 298/22 C |
| 2010/0327649 | A1* | 12/2010 | Kvist et al. | 298/19 R |

FOREIGN PATENT DOCUMENTS

EP  2172364  4/2010

* cited by examiner

*Primary Examiner* — Tuan C. To
*Assistant Examiner* — Isaac Smith
(74) *Attorney, Agent, or Firm* — Faegre Baker Daniels LLP

(57) ABSTRACT

A stability detection system is provided for detecting the stability of an articulated vehicle. The stability detection system may include a weigh system configured to measure the weight distribution of the vehicle. A controller may provide a warning when the detected weight distribution exceeds a threshold.

17 Claims, 6 Drawing Sheets

WEIGHT-BASED STABILITY DETECTION SYSTEM

FIELD

The present disclosure relates to stability detection, and more particularly to a weight-based stability detection system for detecting a rollover condition of a work vehicle.

BACKGROUND AND SUMMARY

Articulated vehicles, such as articulated dump trucks (ADT's), are known in the art. For example, ADT's typically include a cab portion having a first frame supporting an operator cab, and a trailer portion having a second frame supporting a bin. The bin is configured to contain a load and is typically coupled to an actuator for angular movement relative to the second frame. The first frame and the second frame may be operably coupled through an articulation joint.

ADT's may suffer from stability issues when not operated or loaded correctly. For example, instability may arise from the ADT being poorly loaded or being near the end of the articulation range and may be aggravated by operation of the ADT in such a condition at relatively high speeds or on a slope. Instability may result in a "bin dump" condition where the center of gravity of the trailer portion moves outside of the wheel base of the trailer portion. In this condition, the trailer portion may roll over while the cab portion remains upright.

According to an embodiment of the present disclosure, a vehicle having a chassis is provided. The chassis includes a cab portion, a trailer portion, and a coupling assembly positioned between the cab portion and the trailer portion. The cab portion includes a first frame, and the trailer portion includes a second frame. The coupling assembly is configured to provide pivoting movement of the trailer portion relative to the cab portion, and the trailer portion includes a bin configured to contain a load. A first wheel assembly is coupled to the first frame to support the cab portion, and second and third wheel assemblies are coupled to the second frame to support the trailer portion. A weigh system is positioned to detect weight supported by each of the second and third wheel assemblies. A controller in communication with the weigh system is configured to determine a measure of the stability of the trailer portion based on a comparison of the detected weight on the second wheel assembly with the detected weight on the third wheel assembly. The controller generates a warning upon the determined measure of stability being outside a threshold range.

According to another embodiment of the present disclosure, a vehicle is provided including a front portion and a trailer portion. The front portion includes a front frame, and a front wheel assembly is operably coupled to the front frame to support the front portion. The trailer portion includes a rear frame and a bin supported by the rear frame, and the bin is configured to support a load. First and second rear wheel assemblies are operably coupled to the rear frame to support the trailer portion. A frame coupling is positioned between the front frame and the rear frame, the frame coupling being configured to provide pivoting movement between the front frame and the rear frame. A first weight detector is positioned to measure weight supported by the first rear wheel assembly, and a second weight detector is positioned to measure weight supported by the second rear wheel assembly. At least one sensor supported by the vehicle is configured to detect a parameter of the vehicle. A controller in communication with the first and second weight detectors calculates a weight distribution of the vehicle on the first and second wheel assemblies based on a comparison of the measured weights supported by the first and second rear wheel assemblies. The controller is configured to determine the stability of the vehicle based on a comparison of the calculated weight distribution with a threshold weight distribution range. The controller dynamically adjusts the threshold weight distribution range based on input from the at least one sensor.

According to yet another exemplary embodiment of the present disclosure, a method of determining the stability of an articulated vehicle is provided. The method includes the step of providing a vehicle having a cab portion, a trailer portion, and a coupling member positioned between the cab portion and the trailer portion. The cab portion includes a first frame supported by a front wheel assembly, and the trailer portion includes a second frame supported by first and second rear wheel assemblies. The method includes setting a threshold range representative of a range of weight distributions of the vehicle on the first and second rear wheel assemblies, receiving a first weight measurement representative of weight supported by the first wheel rear assembly, and receiving a second weight measurement representative of weight supported by the second rear wheel assembly. The method further includes detecting a parameter of the vehicle with a vehicle sensor and calculating a weight distribution of the vehicle on the first and second rear wheel assemblies based on the first and second weight measurements. The method further includes monitoring the stability of the vehicle based on a comparison of the weight distribution with the threshold range and dynamically adjusting the threshold range based on a change in the detected parameter of the vehicle.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
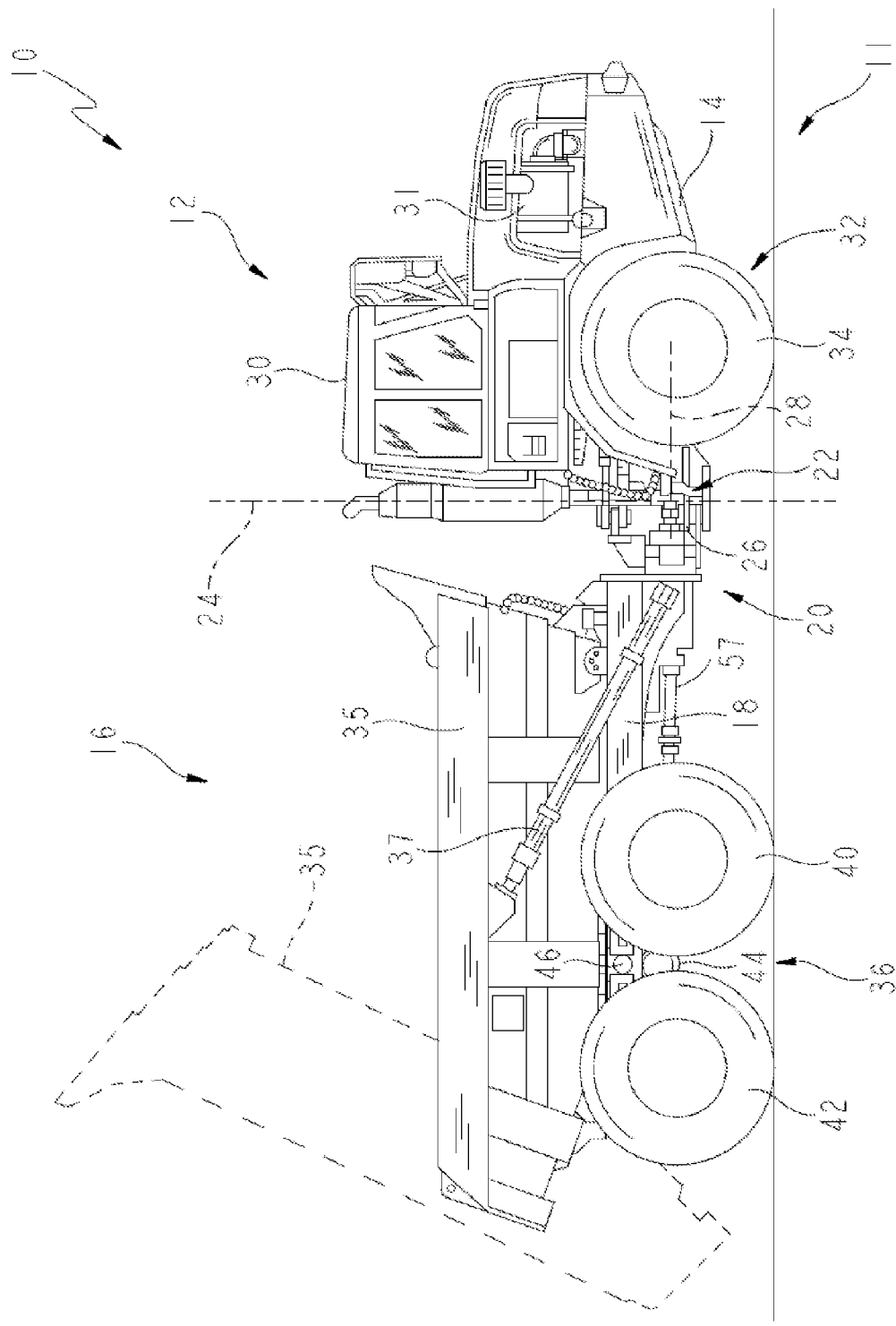
FIG. 1 illustrates an exemplary articulated vehicle incorporating the stability detection system of the present disclosure.
Figure 2:
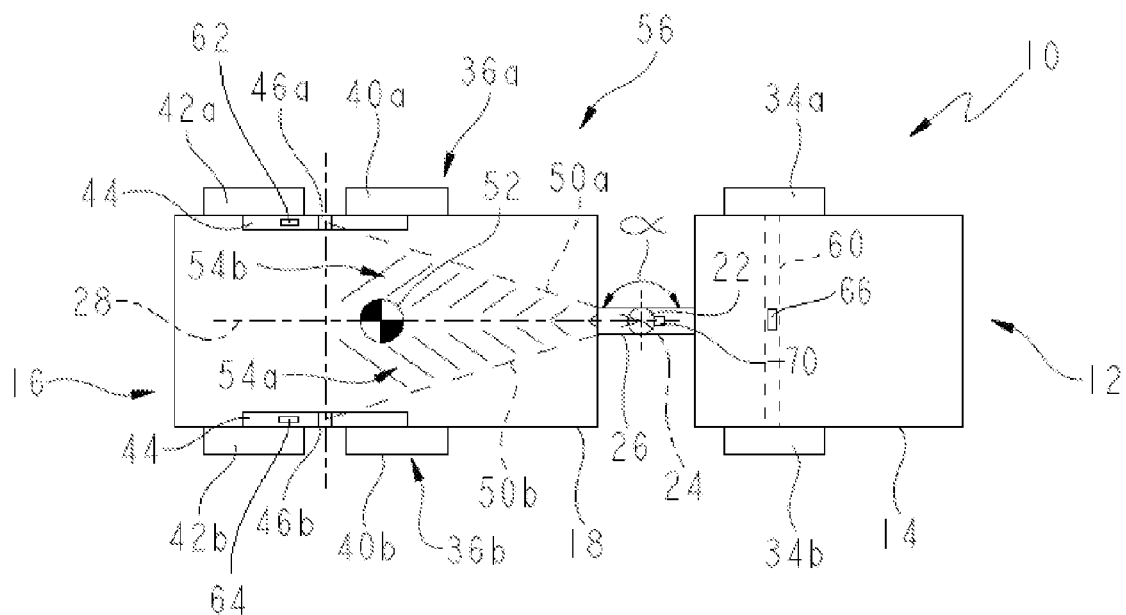
FIG. 2 illustrates a top schematic view of the articulated vehicle of FIG. 1 with a first frame and a second frame in an aligned position.

Referring initially to FIGS. 1 and 2, an exemplary articulated vehicle 10 includes a chassis 11 having a first or cab portion 12 and a second or trailer portion 16. Cab portion 12 includes a first frame 14, and trailer portion 16 includes a second frame 18. First frame 14 is connected to second frame 18 through a coupling assembly 20. In the illustrated embodiment, coupling assembly 20 includes a pivot frame coupling 22 and a rotational frame coupling 26. Pivot frame coupling 22 provides for articulated movement, or pivoting, of second frame 18 relative to first frame 14 about a vertical axis 24. Rotational frame coupling 26 provides for rotational movement of second frame 18 relative to first frame 14 about a longitudinal axis 28. In one embodiment, vehicle 10 includes one or more hydraulic actuators configured to control the angle between first and second frames 14, 18 for steering vehicle 10.

First frame 14 illustratively supports an operator's cab 30 and an engine 31 for propelling vehicle 10. A first or front wheel assembly 32 supports cab portion 12 and is operably coupled to first frame 14. First wheel assembly 32 illustratively includes a pair of wheels 34a and 34b. Additional wheels and/or wheel assemblies may be used to support cab portion 12.

A dump body or bin 35 for containing a load is supported by second frame 18. An actuator, such as a hydraulic cylinder 37, may be coupled to bin 35 for angularly elevating bin 35 relative to second frame 18 (as shown in phantom in FIG. 1).

Figure 4:
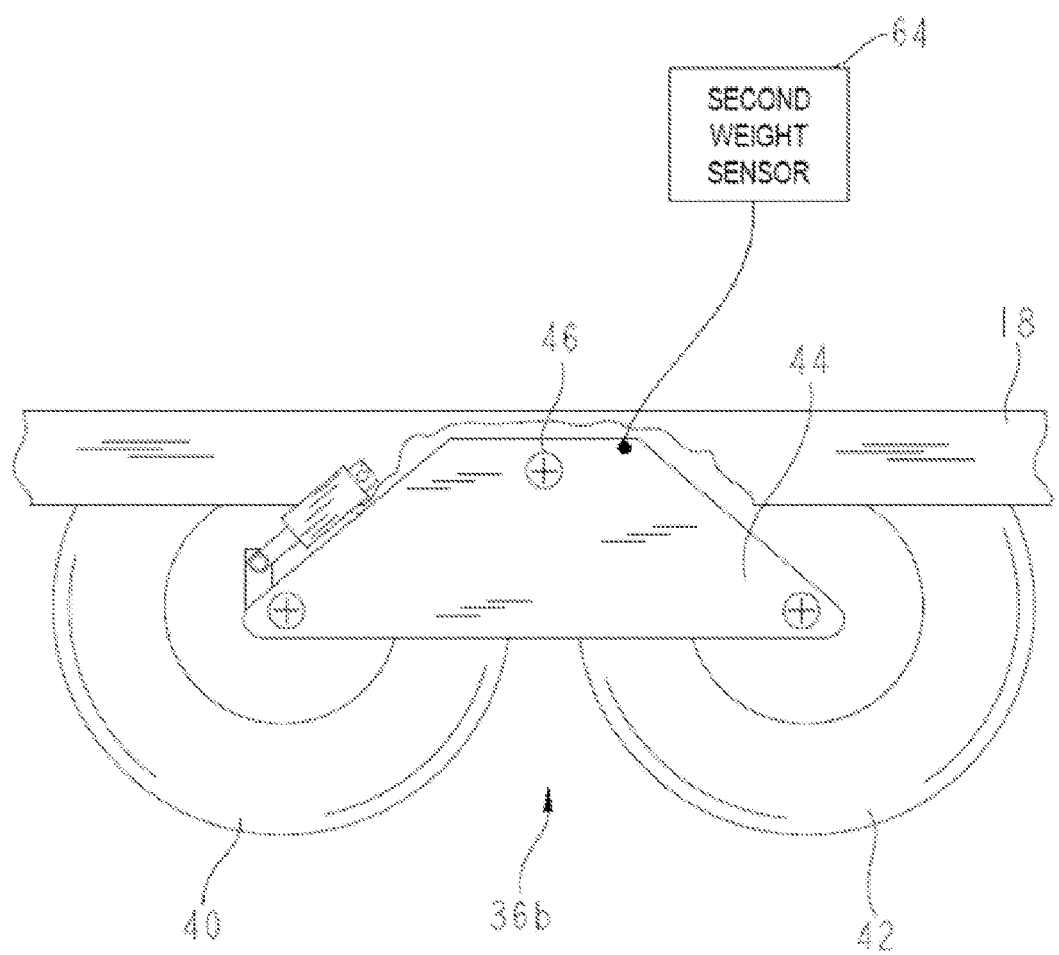
FIG. 4 illustrates an exemplary rear wheel assembly of the vehicle of FIG. 1.

Left and right rear wheel assemblies 36a, 36b support second frame 18 and each illustratively includes a front wheel 40 and a rear wheel 42. In the illustrated embodiment, each of front wheels 40 and rear wheels 42 are rotatably coupled to a tandem or walking beam 44 (see also FIG. 4). Tandem 44 is pivotally coupled to second frame 18 through a pivot tandem coupling 46. Operation of tandem 44 facilitates pivoting movement of front wheel 40 relative to rear wheel 42 about coupling 46, thereby facilitating continuous ground engagement by wheels 40 and 42. In the illustrated embodiment of FIGS. 1, 2, and 4, coupling 46 consists of a rigid shaft that extends from second frame 18 to tandem 44 to provide the pivoting therebetween. In one embodiment, other than rotation, shaft 46 has a fixed position relative to second frame 18 such that shaft 46 moves vertically, longitudinally, and laterally with second frame 18. As a result, as bin 35 is loaded and unloaded and when vehicle 10 rides over bumpy or uneven terrain, shaft 46 moves with second frame 18.

In the illustrated embodiment, front and rear wheels 40 and 42 are at a fixed distance from shaft 46. As a result, the vertical location of the axis of rotation of front and rear wheels 40 and 42 relative to second frame 18 is independent of the load carried by bin 35. In the illustrated embodiment, because rigid shaft 46 is directly coupled to second frame 18 and tandem 44, the spring constant between second frame 18 and tandem 44 is large so that there is substantially no body roll between second frame 18 and tandem 44.

Vehicle 10 may include alternative wheel assembly configurations. For example, fewer or more wheels may support trailer portion 16 and/or cab portion 12. In one embodiment, first wheel assembly 32 may include a single axle assembly coupled between wheels 34a and 34b and to first frame 14. See, for example, front axle 60 illustrated in phantom in FIG. 2. Alternatively, an independent axle may couple each wheel 34a, 34b to first frame 14. Similarly, trailer portion 16 may be supported by one or more single axle wheel assemblies having two wheels coupled at opposite ends of a single axle assembly coupled to second frame 18. In one embodiment, a drive shaft 57 (see FIG. 1) coupled between front wheel assembly 32 and rear wheel assemblies 36a, 36b includes a differential for allowing front wheel assembly 32 to rotate at different speeds than rear wheel assemblies 36a, 36b. The respective axles of front and rear wheel assemblies 32, 36a, 36b may also include one or more differentials.

In some extreme operating conditions, vehicle 10 or trailer portion 16 may become unstable due to a shift in the center of gravity of vehicle 10. Several factors may contribute to the instability of vehicle 10 or trailer portion 16, including the steering angle, the ground speed, the smoothness of the terrain, the position of bin 35, the load condition of trailer portion 16, and/or the slope angle of vehicle 10, for example. Movement of the center of gravity of trailer portion 16 or vehicle 10 toward the outside of the wheelbase may put vehicle 10 at risk of tipping over.

For example, as trailer portion 16 approaches a tip-over condition, the combined weight of trailer portion 16 and any load supported therein is substantially carried by either the left rear wheel assembly 36a or the right rear wheel assembly 36b. Referring to FIG. 2, during a normal or unrestricted mode or operation, a line of action 50a, 50b extends between pivot frame coupling 22 and each tandem coupling 46a, 46b. Trailer portion 16, including second frame 18, bin 35 and any load supported therein, defines a center of gravity 52. If the center of gravity 52 moves out of the stability regions 54a, 54b defined between the longitudinal axis 28 and the lines of action 50a, 50b, then the trailer portion 16 may become unstable and roll over. In some operating conditions, the weight of cab portion 12 may contribute to the load on wheel assemblies 36a, 36b and to the location of the center of gravity 52.

Similarly, when bin 35 is in a raised position and carrying a load, and vehicle 10 is positioned on a slope such that front wheel assembly 32 is positioned above rear wheel assemblies 36a, 36b, the center of gravity of vehicle 10 moves towards the back of the vehicle 10. If the center of gravity of vehicle 10 shifts to a point behind rear wheel assemblies 36a, 36b, the combined weight of vehicle 10 falls substantially on rear wheels 42, and the vehicle 10 may be at risk of tipping over backward. Other factors may further influence the center of gravity location and stability of vehicle 10, including the load carried by bin 35 being in a frozen state.

Figure 3:
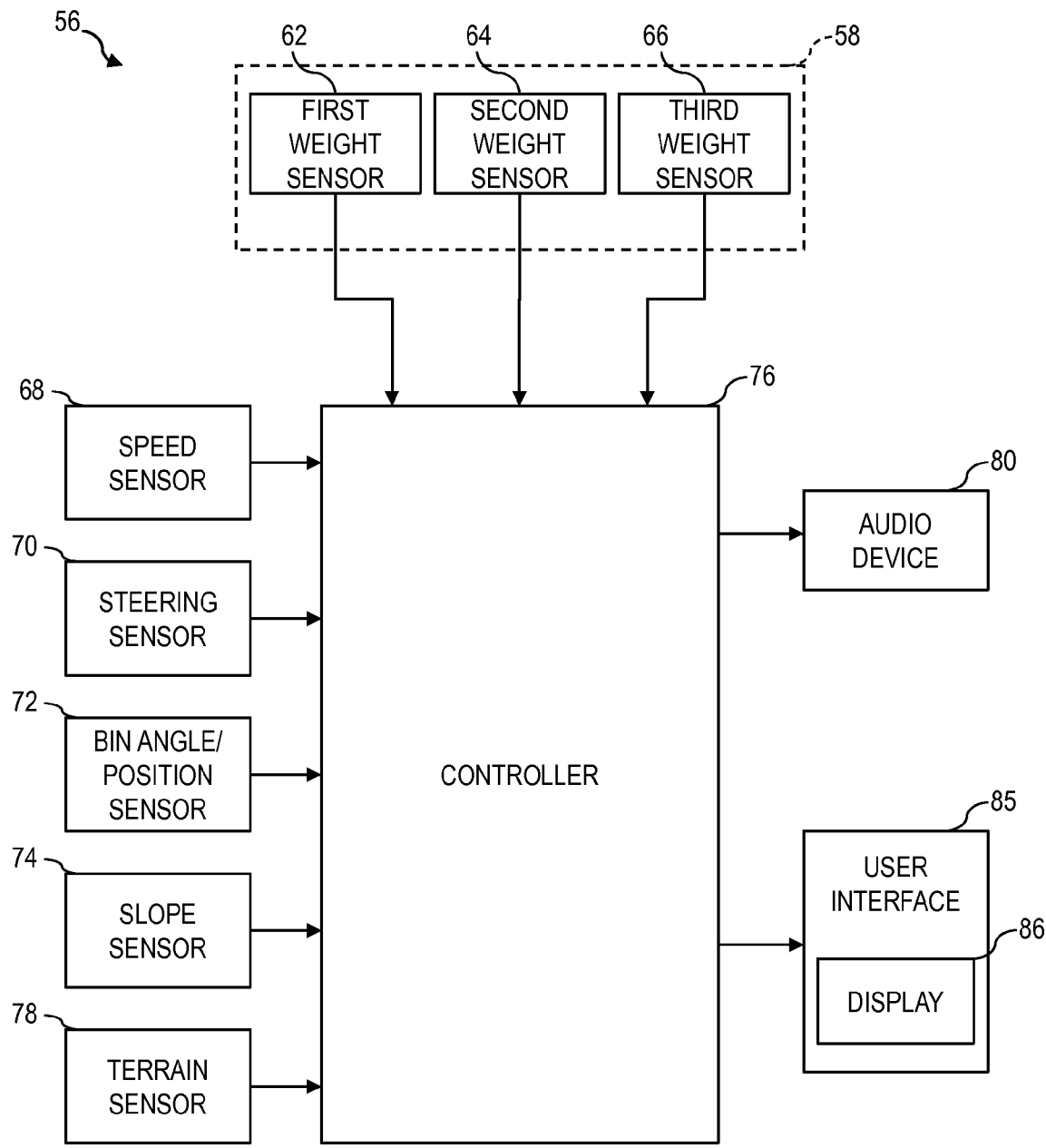
FIG. 3 illustrates a representative view of an exemplary stability detection system of the vehicle of FIG. 1.

Referring to FIG. 3, vehicle 10 includes an onboard stability detection system 56 to monitor the stability of trailer portion 16 and/or vehicle 10 and to initiate a warning when trailer portion 16 or vehicle 10 approaches a tip-over condition. Stability detection system 56 includes a weigh system 58 and a controller 76 in communication with weigh system 58. Controller 76 may be included with a vehicle control unit of vehicle 10, but may alternatively be a separate controller from the vehicle control unit. Controller 76 includes a processor having a memory containing software configured to analyze inputs from various vehicle sensors. A user interface 85 may also be provided for the operator to access controller 76, for example, to modify settings or to input instructions. Controller 76 may also provide feedback to user interface 85. User interface 85 may be of conventional design, such as a keypad or control panel, and may be positioned within cab 30. User interface 85 illustratively includes a display 86 for providing an operator with vehicle information, such as vehicle speed, diagnostics, sensor information, or other vehicle parameters.

Stability detection system 56 independently measures the weight on each of left and right rear wheel assemblies 36a, 36b during the operation of vehicle 10. In particular, weigh system 58 includes a first weight sensor 62 coupled to wheel assembly 36a and a second weight sensor 64 coupled to wheel assembly 36b. Weight sensors 62, 64 measure the load of vehicle 10 on each of wheel assemblies 36a, 36b, respectively, and provide signals indicative of the measured loads to controller 76. As described herein, the trailer portion 16 and any load contained therein contribute to the measured weight at sensors 62, 64. In some conditions, the weight of cab portion 12 may also contribute to the weight on wheel assemblies 36a, 36b detected with weight sensors 62, 64.

Figure 5:
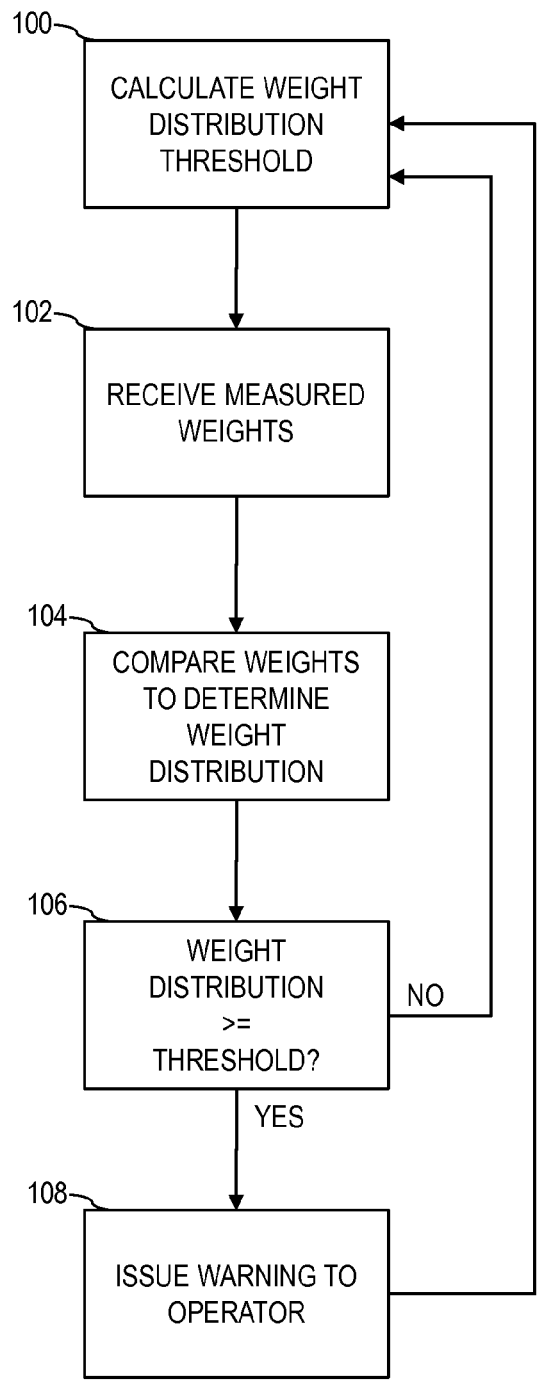
FIG. 5 illustrates an exemplary method of detecting vehicle stability according to one embodiment.

Referring to FIG. 5, an exemplary method of stability detection with stability detection system 56 is illustrated. Controller 76 calculates a threshold weight distribution value or range at block 100 based on various parameters and inputs from vehicle sensors, as described herein. At blocks 102 and 104, based on inputs from weight sensors 62, 64, controller 76 compares the measured weights supported by each wheel assembly 36a, 36b to determine the weight distribution on wheel assemblies 36a, 36b. At block 106, controller 76 compares the calculated weight distribution to the calculated threshold value or range of values, and at block 108 provides a warning to the operator if the calculated weight distribution exceeds the threshold value or is outside the range of values.

As trailer portion 16 approaches a tip-over condition, the weight distribution begins to shift to one of wheel assemblies 36a, 36b. As described herein, at the tip-over condition, the center of gravity 52 of trailer portion 16 falls outside the wheel base of the vehicle 10, and the combined weight of trailer portion 16 and the load in bin 35 is carried by either left rear wheel assembly 36a or right rear wheel assembly 36b. As such, at the tip-over condition, a 100% weight distribution will be detected at either first weight sensor 62 or second weight sensor 64.

For example, with a weight distribution threshold range of 50% to 90%, controller 76 will initiate a warning to an operator when 90% or more of the combined weight of trailer portion 16 and any load contained therein is on either left rear wheel assembly 36a or right rear wheel assembly 36b (i.e., when the left-to-right or right-to-left weight ratio on wheel assemblies 36a, 36b is nine-to-one). Upon receiving the warning, an operator may adjust control of the vehicle appropriately to avoid tipping over trailer portion 16 or vehicle 10.

Figure 7:
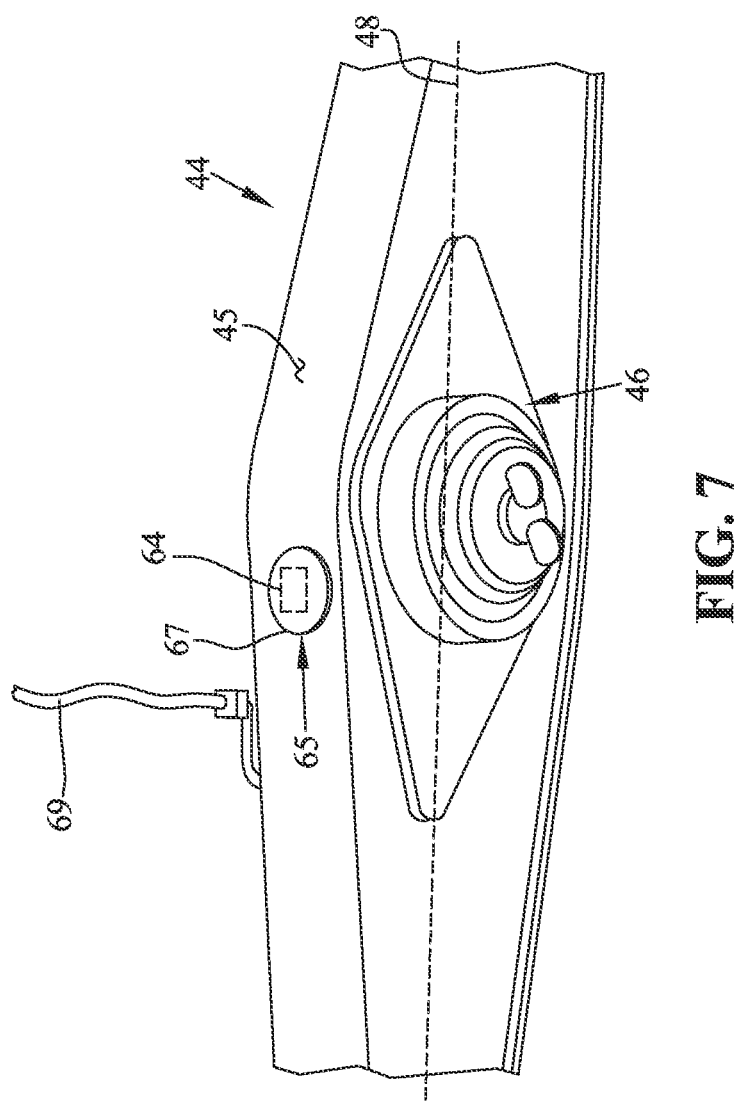
FIG. 7 illustrates an exemplary walking beam of the vehicle of FIG. 1 including a weight sensor.

In the illustrated embodiment, first and second weight sensors 62, 64 are strain gauges each mounted to a corresponding walking beam 44 for detecting the strain on beams 44 due to the weight of vehicle 10. See, for example, second weight sensor 64 coupled to beam 44 illustrated in FIGS. 4 and 7. Referring to FIG. 7, strain gauge or weight sensor 64, shown in phantom, is positioned in a cavity 65 located in a top surface 45 of walking beam 44. In the illustrated embodiment, sensor 64 and cavity 65 are positioned near a center portion of walking beam 44 and above shaft 46 for detecting the load on beam 44, although sensor 64 may be positioned in other suitable positions. A cover 67 is provided in cavity 65 to substantially enclose sensor 64 within cavity 65. In one embodiment, a seal is provided between cover 67 and the surface forming cavity 65 to provide a sealed enclosure for sensor 64. A sensor cable 69 is configured to couple sensor 64 to controller 76 for providing feedback to controller 76. Sensor 64 is illustratively positioned substantially parallel to a longitudinal axis 48 of walking beam 44, although sensor 64 may also be positioned substantially perpendicular to axis 48 of walking beam 44. In one embodiment, sensor 64 includes one strain gauge mounted substantially parallel to axis 48 and another strain gauge mounted substantially perpendicular to axis 48. In one embodiment, sensor 64 is coupled to walking beam 44 with an adhesive.

By detecting the strain on beams 44 of wheel assemblies 36a, 36b, sensors 62, 64 provide electrical signals indicative of the weight on each wheel assembly 36a, 36b to controller 76. Weight sensors 62, 64 may be mounted at other locations suitable for measuring the weight on each wheel assembly 36a, 36b. Further, other suitable weight sensors may be provided for detecting the weight supported by wheel assemblies 36a, 36b.

In one embodiment, weigh system 58 includes one or more third weight sensors 66 coupled to front wheel assembly 32 for measuring the load of vehicle 10 on front wheel assembly 32, as illustrated in FIGS. 2 and 3. Based on the input from third weight sensor 66, controller 76 may compare the measured weights on rear wheel assemblies 36a, 36b and front wheel assembly 32 to determine the weight distribution of vehicle 10. Controller 76 may compare the calculated weight distribution to a threshold value or range, and provide a warning to the operator if the calculated weight distribution exceeds the threshold value or falls outside the threshold range. For example, with the weight distribution threshold set at 90%, controller 76 may initiate a warning when 90% or more of the combined weight of vehicle 10 and any load contained therein is on either rear wheel assemblies 36a, 36b or front wheel assembly 32 (i.e., when the front-to-back or back-to-front weight ratio on wheel assemblies 32, 36a, 36b is nine-to-one).

In one embodiment, two weight sensors 66 are coupled to front axle 60 for measuring the load on the left and right portions of front axle 60 of front wheel assembly 32. For example, a weight sensor 66 may be coupled to the front left axle near wheel 34a, and another weight sensor 66 may be coupled to the front right axle near wheel 34b. Alternatively, weight sensors 66 may be mounted at other suitable locations on front wheel assembly 32 for measuring the weight of vehicle 10 on front wheel assembly 32. Further, additional or fewer weight sensors 66 may be provided for measuring the load on front wheel assembly 32.

Alternatively, controller 76 may determine the front-to-back weight distribution of vehicle 10 based on first and second weight sensors 62, 64 without the use of third weight sensor 66. With the weight of unloaded vehicle 10 stored in memory, controller 76 may determine an approximate total loaded weight of vehicle 10 based on the detected load in bin 35 (detected with weight sensors 62, 64). Controller 76 may compare the weight supported by rear wheel assemblies 36a, 36b to the determined total weight of vehicle 10 to detect the weight distribution of vehicle 10. For example, controller 76 may detect when a certain percentage (90%, for example) of the combined weight of vehicle 10 and any load contained therein is on rear wheel assemblies 36a, 36b or front wheel assembly 32 based on the detected weight on rear wheel assemblies 36a, 36b.

Figure 6:
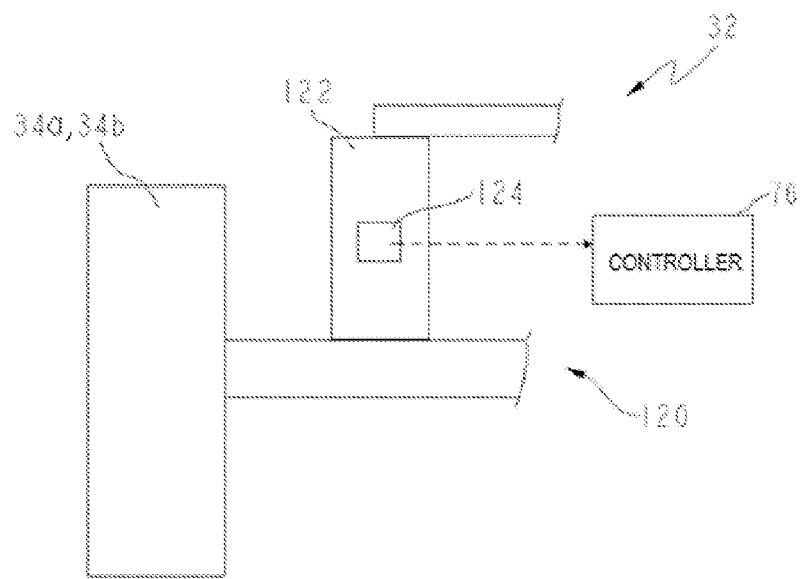
FIG. 6 illustrates a representative view of an exemplary strut assembly of the vehicle of FIG. 1 including a strut height sensor.

The weight distribution on front wheel assembly 32 may be further determined by measuring the height of the strut assembly at each of the left and right wheels 34a, 34b. Referring to FIG. 6, front wheel assembly 32 includes a strut suspension system 120 having a shock absorber 122 coupled to each of wheels 34a, 34b and configured to compress in response to the weight of vehicle 10 on wheel 34a, 34b. A strut height sensor 124 in communication with controller 76 may be mounted to strut suspension system 120 at each of wheels 34a, 34b to measure the height or compression distance of strut suspension system 120 due to the weight of vehicle 10. In the illustrated embodiment, strut height sensor 124 is mounted to shock absorber 122 and measures the compression distance of shock absorber 122, although strut height sensor 124 may be mounted at other locations on strut suspension system 120 suitable for measuring the height or compression of strut suspension system 120. Based on the measured strut height, controller 76 may determine the weight of vehicle 10 on wheel 34a, 34b. Accordingly, controller 76 may determine the weight distribution of vehicle 10 on wheels 34a, 34b for use in analyzing the stability of vehicle 10. For example, as strut suspension system 120 approaches an unloaded state, controller 76 may determine that the weight of vehicle 10 is shifting towards the back of vehicle 10 and that vehicle 10 is approaching a backwards tipover condition.

In the illustrated embodiment, controller 76 dynamically adjusts the weight distribution threshold based on inputs from additional sensors provided on vehicle 10. Referring again to FIG. 3, stability detection system 56 includes a speed sensor 68, a steering angle sensor 70, a bin position sensor 72, a slope sensor 74, and a terrain sensor 78 in communication with controller 76. In one embodiment, slope sensor 74 and terrain sensor 78 comprise a single sensor. In particular, slope data obtained from slope sensor 74 may be used to determine terrain information. Based on inputs 90 from these sensors, the weight distribution threshold on wheel assemblies 36a, 36b may be dynamically altered to accommodate changing operating conditions. In the illustrated embodiment, the weight distribution threshold is the threshold at which a warning or alarm is provided to an operator.

Speed sensor 68 and steering angle sensor 70 may be coupled to controller 76 for measuring the speed and steering angle of vehicle 10, respectively. Steering angle sensor 84 may comprise a conventional potentiometer, or other suitable angle sensor. In one embodiment, steering angle sensor 70 is coupled to coupling assembly 20 for measuring the articulation or pivoting angle α between first frame 14 and second frame 18, as illustrated in FIG. 2. In one embodiment, one or more steering angle sensors 70 may be used to measure both the rotational angle and the pivoting angle α of second frame 18 relative to first frame 14. In response to the measured speed and steering angle, controller 76 may adjust the threshold level of the weight distribution on wheel assemblies 36a, 36b. For example, as the vehicle speed increases and second frame 18 rotates or pivots relative to first frame 14, controller 76 may lower the weight distribution threshold due to a potentially higher tip-over risk resulting from increased vehicle momentum or inertia. As such, a warning is provided sooner than if the vehicle was moving in a straight line to account for the increased momentum of vehicle 10. In one embodiment, controller 76 progressively lowers the weight distribution threshold as the steering angle and/or speed progressively increase. Alternatively, controller 76 may adjust the weight distribution threshold based on the measured speed alone or the measured steering angle alone.

Bin inclination sensor 72 is configured to measure the angle of inclination of bin 35 relative to second frame 18. In response to the measured position of bin, controller 76 may adjust the threshold level of the weight distribution on wheel assemblies 36a, 36b. For example, a raised bin 35 moves the center of gravity 52 towards the back of vehicle 10 and higher relative to vehicle 10, potentially leading to a more unstable vehicle 10 than with bin 35 in a lowered position, depending on other operating conditions. As a result, controller 76 may decrease the weight distribution threshold as bin 35 moves from a lowered position to a raised position. Bin inclination sensor 72 may comprise a conventional potentiometer, or other suitable angle sensor or position sensor.

The threshold adjustment due to the measured angle of bin 35 may further depend on the presence of a load in bin 35. For example, when a loaded bin 35 is raised relative to second frame 18, the material contained in bin 35 may shift, resulting in a sudden shift in the center of gravity 52 of trailer portion 16 that may increase the instability of vehicle 10. As such, controller 76 may further decrease the weight distribution threshold when bin 35 is loaded compared to when bin 35 is not loaded to account for a potentially greater risk of tip-over. Weight sensors 62, 64 may be used to detect the presence and weight of a load in bin 35, or vehicle 10 may include a separate sensor for load detection.

Slope sensor 74 is configured to measure the slope of the ground under vehicle 10. In response to the measured slope angle, controller 76 may adjust the warning threshold level of the weight distribution on wheel assemblies 36a, 36b. With vehicle 10 at an angle due to the slope of the ground, material contained in bin 35 may shift, resulting in a sudden shift in the center of gravity 52 of trailer portion 16 that may increase the instability of vehicle 10. Further, the slope of the ground combined with the position of bin 35 may cooperate to affect the location of the center of gravity of vehicle 10. As a result, controller 76 may decrease the weight distribution threshold upon detection of an increase in the slope angle to account for a potentially greater tip-over risk. Other factors may contribute to the threshold adjustment, including the direction of the slope and the weight of the load in bin 35. In one embodiment, controller 76 decreases the weight distribution threshold based on both an increased slope angle and the detection of a load in bin 35.

As described herein, slope sensor 74 may also be used to determine the evenness or surface contour of the ground or terrain. Controller 76 may dynamically adjust the weight distribution threshold based on the evenness of the ground being traversed by vehicle 10. Uneven ground may result in sudden momentum shifts and accelerations of vehicle 10 that contribute to the instability of vehicle 10. For example, a series of bumps in the travel path of vehicle 10 may progressively move the center of gravity 52 towards the outside of the wheelbase of vehicle 10. Further, momentum shifts due to uneven terrain may result in a sudden shift of material contained in bin 35, possibly further decreasing the stability of vehicle 10. As a result, upon detection of rough terrain conditions, controller 76 may decrease the weight distribution threshold to accommodate a potentially increased risk of reaching a tip-over condition. Slope sensor 74 may comprise a conventional inclinometer, or other suitable sensor for detecting slope or inclination. In one embodiment, slope sensor 74 may comprise one or more accelerometers, such as tri-axial accelerometers, mounted to vehicle 10 to detect the ground slope and vehicle accelerations and/or momentum shifts indicative of terrain. Alternatively, slope sensor 74 may include a gyroscope device.

In the illustrated embodiment, controller 76 may adjust the weight distribution threshold based on unique combinations of inputs from sensors 68, 70, 72, 74, 78. For example, certain operating conditions detected with one sensor may affect the weight distribution threshold when additional operating conditions are detected with another sensor. For example, as described above, the speed of vehicle 10 detected with speed sensor 68 may affect the weight distribution threshold only when combined with the detection of a steering angle with steering angle sensor 70. Other combinations of sensor inputs may be used to adjust the weight distribution threshold.

As described herein, controller 76 provides a warning signal to the operator upon determining that the measured weight distribution meets or exceeds the calculated weight ratio threshold. In the illustrated embodiment, stability detection system 56 includes an audio device 80 in communication with controller 76, as shown in FIG. 3, that provides an audible warning to the operator. Audio device 80 may include a loudspeaker, buzzer, beeper, or other suitable device configured to provide an audible warning to an operator. In one embodiment, user interface 85 displays a visual warning to an operator on display 86. In one embodiment, the calculated weight distribution and the weight distribution threshold are provided on display 86 for viewing by an operator.

In one embodiment, the type of warning signal provided to an operator may vary based on the level of the detected weight distribution. For example, with a weight distribution threshold set at 90%, controller 76 may provide an initial warning of a first type upon the measured weight distribution reaching 70%, a warning of a second type when the measured weight distribution reaches 80%, and a warning of a third type when the measured weight distribution reaches the threshold of 90%. For example, the different types of warnings may be audio warnings varying in loudness, duration, tone, pitch, etc. An operator may differentiate between various levels of tip-over risk based on the type of warning signal provided and control the operation of vehicle 10 accordingly.

In one embodiment, controller 76 may initiate a control event to automatically adjust or inhibit an operation of vehicle 10 to reduce the likelihood of vehicle 10 reaching a tip-over condition. For example, controller 76 may inhibit movement of bin 35 upon detection of the measured weight distribution exceeding a threshold. Further, upon a determination that the measured weight distribution exceeds a threshold, controller 76 may initiate control of an automatic stabilization system that facilitates the reduction of tip-over risk. See, for example, the stabilization system disclosed in U.S. application Ser. No. 12/258,066, filed Oct. 24, 2008, entitled "Articulated Vehicle Stabilization System," now U.S. Patent Application Publication No. 2009/0196722, the disclosure of which is incorporated herein by reference.

While stability detection system 56 is described herein with respect to articulated vehicle 10, stability detection system 56 may be implemented on other types of vehicles. For example, stability detection system 56 may be implemented in other work or utility vehicles such as a motor grader, a tractor, a bulldozer, a feller buncher, a crawler, an excavator, a skidder, or another utility vehicle. Similarly, stability detection system 56 may also be implemented in a commercial vehicle or other roadworthy motor vehicles.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A vehicle including:
a front portion including a front frame;
a front wheel assembly operably coupled to the front frame to support the front portion;
a trailer portion including a rear frame and a bin supported by the rear frame, the bin being configured to support a load;
first and second rear wheel assemblies operably coupled to the rear frame to support the trailer portion;
a frame coupling positioned between the front frame and the rear frame, the frame coupling being configured to provide pivoting movement between the front frame and the rear frame;
a first weight detector positioned to measure weight supported by the first rear wheel assembly;
a second weight detector positioned to measure weight supported by the second rear wheel assembly, a combined measured weight including the weights measured by the first and second weight detectors;
at least one sensor supported by the vehicle and configured to detect at least one parameter of the vehicle, the at least one sensor including a steering angle sensor configured to detect a steering angle of the vehicle, a vehicle speed sensor configured to detect a vehicle speed, and a slope sensor configured to detect a slope of the ground traversed by the vehicle; and
a controller in communication with the first and second weight detectors, the steering angle sensor, the vehicle speed sensor, and the slope sensor, the controller determining a weight of the load in the bin based on an unloaded weight of the vehicle and the weights measured by the first and second weight detectors, the controller calculating a weight distribution of the vehicle on the first and second wheel assemblies by calculating a percentage of the combined measured weight measured by each of the first and second weight detectors, the controller being configured to determine the stability of the vehicle based on a comparison of the calculated weight distribution with a threshold weight distribution range, the threshold weight distribution range having a low threshold percentage and a high threshold percentage, wherein the comparison includes comparing the calculated percentages of the combined measured weight on the first and second rear wheel assemblies with the threshold weight distribution range, the controller determining the vehicle is instable upon the percentage of the combined measured weight measured by the first or second weight detector being outside the threshold weight distribution range, the controller dynamically adjusting at least one of the low threshold percentage and the high threshold percentage of the threshold weight distribution range based on the steering angle, the vehicle speed, the slope of the ground, and the weight of the load in the bin, wherein when the steering angle is nonzero the controller reduces the threshold weight distribution range in response to the vehicle speed increasing, when the steering angle is zero the controller maintains the threshold weight distribution range in response to the vehicle speed increasing, and the controller reduces the threshold weight distribution range in response to the weight of the load in the bin increasing.

2. The vehicle of claim 1, wherein the controller provides a warning signal to an operator upon a determination that the calculated weight distribution is outside the threshold weight distribution range, the warning signal including at least one of an audible signal and a visual signal.

3. The vehicle of claim 2, further including a user interface in communication with the controller, the user interface being configured to provide inputs to the controller and to receive communications from the controller, the controller providing the warning signal through the user interface.

4. The vehicle of claim 1, wherein the steering angle sensor is positioned to detect a lateral pivoting angle between the front frame and the rear frame, the controller dynamically adjusting the threshold weight distribution range based on the detected lateral pivoting angle.

5. The vehicle of claim 1, wherein the at least one sensor includes a bin angle sensor for determining a bin angle of the bin of the vehicle, the controller dynamically adjusting the threshold weight distribution range further based on the detected bin angle.

6. The vehicle of claim 1, wherein the at least one sensor includes a terrain sensor for detecting the evenness of the ground traversed by the vehicle, the controller dynamically adjusting the threshold weight distribution range based on the detected evenness of the ground.

7. The vehicle of claim 1, further including a third weight detector positioned to measure the weight of the vehicle on the front wheel assembly, the controller calculating a second weight distribution of the vehicle based on a comparison of the measured weight on the front wheel assembly with the measured weight on the first and second rear wheel assemblies, the controller determining the stability of the vehicle based on a comparison of the second weight distribution with a second threshold weight distribution range.

8. The vehicle of claim 7, wherein the controller dynamically adjusts the second threshold weight distribution range based on input from the at least one sensor, the controller providing a warning to an operator upon the second weight distribution being outside the second threshold weight distribution range.

9. A method of determining the stability of an articulated vehicle, the method including the steps of:
providing a vehicle having a cab portion, a trailer portion, and a coupling member positioned between the cab portion and the trailer portion, the cab portion including a first frame supported by a front wheel assembly, the trailer portion including a second frame supported by first and second rear wheel assemblies, the trailer portion including a bin supported by the second frame and configured to contain a load, the bin being configured to move relative to the second frame between a lowered position and a raised position, the vehicle further including a controller configured to monitor a stability of the vehicle;
setting a threshold range representative of a range of weight distributions of the vehicle on the first and second rear wheel assemblies, the threshold range having a low threshold percentage and a high threshold percentage;
receiving a first weight measurement representative of weight supported by the first wheel rear assembly, the first weight measurement being measured by a first weight detector in communication with the controller;
receiving a second weight measurement representative of weight supported by the second rear wheel assembly, the second weight measurement being measured by a second weight detector in communication with the controller, a combined weight measurement including the first and second weight measurements;
detecting at least one parameter of the vehicle with at least one vehicle sensor, the at least one vehicle sensor being in communication with the controller and including a steering angle sensor configured to detect a steering angle of the vehicle, a vehicle speed sensor configured to detect a vehicle speed, and a slope sensor configured to detect a slope of the ground traversed by the vehicle;
determining a weight of the load in the bin based on an unloaded weight of the vehicle and the combined weight measurement;
calculating a weight distribution of the vehicle on the first and second rear wheel assemblies by calculating a percentage of the combined weight measurement measured by each of the first and second weight detectors;
monitoring the stability of the vehicle based on a comparison of the weight distribution with the threshold range, wherein the comparison includes comparing the calculated percentages of the combined weight measurement on the first and second rear wheel assemblies with the threshold range, the controller determining the vehicle is instable upon the percentage of the combined weight measurement measured by the first or second weight detector being outside the threshold range; and
dynamically adjusting at least one of the low threshold percentage and the high threshold percentage of the threshold range based on the detected steering angle, the vehicle speed, the slope of the ground, and the weight of the load in the bin, wherein when the steering angle is nonzero the threshold range is reduced in response to an increase in the vehicle speed, when the steering angle is zero the threshold range is maintained in response to an increase in the vehicle speed, and the threshold range is reduced in response to the weight of the load in the bin increasing.

10. The method of claim 9, further including the step of providing a warning signal upon determining that the weight distribution is outside the threshold range.

11. The method of claim 9, further including the steps of providing a first warning when the weight distribution is at a first level relative to the threshold range and providing a second warning when the weight distribution is at a second level relative to the threshold range, the first warning being different from the second warning.

12. The method of claim 9, wherein detecting the steering angle of the vehicle includes detecting a lateral pivoting angle between the cab portion and the trailer portion of the vehicle, and the method further includes reducing the threshold range upon detection of an increase in the lateral pivoting angle of the vehicle.

13. The method of claim 9, further including detecting the position of the bin and reducing the threshold range upon detection of the bin in the raised position.

14. The method of claim 9, wherein the at least one vehicle sensor further includes a terrain sensor configured to detect a rough terrain condition of the ground traversed by the vehicle, the terrain sensor detects at least one of an acceleration of the vehicle and a momentum shift of the vehicle, and the controller determines the rough terrain condition based on the detected at least one of the acceleration and the momentum shift, the method further including reducing the threshold range upon detection of the rough terrain condition.

15. The method of claim 9, further including reducing the threshold range upon detection of an increase in the slope of the ground.

16. The vehicle of claim 1, wherein the controller adjusts the threshold weight distribution range based on the vehicle speed only when a nonzero steering angle is detected.

17. The vehicle of claim 1, wherein the controller calculates a total weight of the vehicle based on the determined weight of the load in the bin and the unloaded weight of the vehicle, the unloaded weight of the vehicle being stored in memory accessible by the controller, the controller calculating a second weight distribution of the vehicle based on a comparison of the calculated total weight of the vehicle with the combined measured weight on the first and second rear wheel assemblies, the controller determining the front-to-back stability of the vehicle based on a comparison of the second weight distribution with a second threshold weight distribution range.

* * * * *